Sept. 10, 1968 G. A. DOTTO 3,401,265

CURRENT CONTROL CIRCUIT WITH SILICON CONTROLLED RECTIFIERS AND A PHASE SHIFTING CIRCUIT

Filed July 6, 1964 4 Sheets-Sheet 1

INVENTOR
GIANNI A. DOTTO
BY [signature]
ATTORNEY

INVENTOR
GIANNI A. DOTTO
BY Robert Levine
ATTORNEY

INVENTOR
GIANNI A. DOTTO
BY Robert [signature]
ATTORNEY

INVENTOR
GIANNI A. DOTTO
BY Robert Levine
ATTORNEY 3,401,265

CURRENT CONTROL CIRCUIT WITH SILICON CONTROLLED RECTIFIERS AND A PHASE SHIFTING CIRCUIT

Gianni A. Dotto, Dayton, Ohio, assignor to P. R. Mallory & Co., Inc., Indianapolis, Ind., a corporation of Delaware Filed July 6, 1964, Ser. No. 380,405
10 Claims. (Cl. 250—206)

ABSTRACT OF THE DISCLOSURE

The gates of oppositely poled SCR's are connected through Zener diodes to a phasing circuit having two capacitors and a variable resistance in series across the SCR's. The resistance may be varied manually, or it may be a thermistor or photoconductive resistor. This circuit may be packaged in conventional lamp sockets and socket extenders.

This invention relates to an electrical control circuit and, particularly, to such a circuit utilizing a multijunction undirectional semiconductor. This is intended for regulating the speed of series or universal type motors, incandescent lamp dimming and similar applications involving alternating current supply.

The multijunctioned unidirectional semiconductor consists of alternate zones of P and N type semiconducting materials contiguous to each other and presenting an odd number of PN junctions. Such a device will conduct current after applications of a gate signal of low value and after application of a blocking signal will recover quickly to be responsive again to further gating signals.

A major object of this invention is to produce an improved control circuit, for AC input, with a minimum number of components capable of providing a gating signal to initiate conduction and depending on the negative part of the cycle to stop conduction.

Another object of this invention is to provide means of controlling the light intensity of incandescent lamps without the use of bulky rheostats which dissipate power that is expensive and heat which creates a problem to remove.

An important object of this invention is to package such control circuitry in presently available lamp sockets, lamp socket extenders with or without outlet receptacles, cube taps, surface and flush receptacles and similar devices.

Another object of this invention is to eliminate the so-called "3-way" lamp which contains two filaments and a selector switch so that either filament or both may be switched on and, instead, use the circuitry described to control the brightness of a single filament lamp.

Still another object of this invention is to provide a circuit which will control the speed of a series-type motor operating from an AC supply without decreasing the output torque at low speeds.

Yet another object of this invention is to provide an AC control circuit for use with unidirectional semiconductors having an odd number of P and N junctions actuated by a control or gating circuit to cause pulses of current to flow through the load, such pulses of a width determined by the manual control position.

Other objects of this invention and the nature thereof will become apparent from the description given later in connection with the attached drawings illustrative of several embodiments of this invention. This is not to be construed as limiting in nature but rather indicative of the numerous methods of teaching this invention and that the scope of the invention is determined from the appended claims.

Control of light intensity in the past, has been accomplished by using multi-tap transformers, adjustable iron-core inductors, and rheostats. These control means are all generally characterized by being bulky, having moving parts, possessed of electrical contacts and, in many cases, being quite noisy. Faulty operation can result from sticking contacts, relays, and mechanical linkages or from foreign matter between contacts.

Speed control of series AC or universal-type motors has been generally accomplished by inserting a series variable resistance between the motor and line or by providing a governor on the motor shaft which interrupts the line current when the desired speed is reached. Likewise, a tapped transformer or variable transformer may be used to reduce the line voltage and, thusly, reduce the speed.

Using a series resistor with the motor has the disadvantage of reducing the output torque as the latter is dependent on the current flowing through the armature. Furthermore, variations in output load results in relatively large changes in speed which is generally undesirable.

A shaft-mounted governor is subject to erratic operation because of the sliding weights and contact errosion and thus may fail to respond to small speed variations and, in some cases, may stick or hang-up in the operating range.

Varying the AC input voltage by some type of transformer is superior to the series resistor method as the speed is not as severely affected by the output load on the motor; nevertheless, the output torque is reduced as the input voltage is reduced.

It is the purpose of this invention to overcome most of the deficiencies cited above in a unit that is compact, long-lived, and readily adaptable to many embodiments as shown in the following drawings.

The mode of operation of the controlled rectifier is as follows: if a source of unidirectional current is applied between the anode and cathode with the positive terminal connected to the anode, then the outer junctions are forwardly biased and the inner junction is reversedly biased. No conduction will take place until enough voltage is applied to the gate electrode so that current flows from it to the cathode. As soon as such flow starts, conduction from anode to cathode occurs and the current is limited almost entirely by the resistance of the external circuit. Once the controlled rectifier begins conducting, it will continue to do so even though the gate electrode is disconnected. The current may be stopped only by reducing or reversing the voltage from anode to cathode for a short time so that conduction falls below the holding value. After this is done, the current will not start again although the original voltage is applied between anode and cathode unless the gate voltage is raised to the firing level. A few milli-amperes of current applied to the gate electrode thus may control currents of hundreds of amperes.

Figure 2:
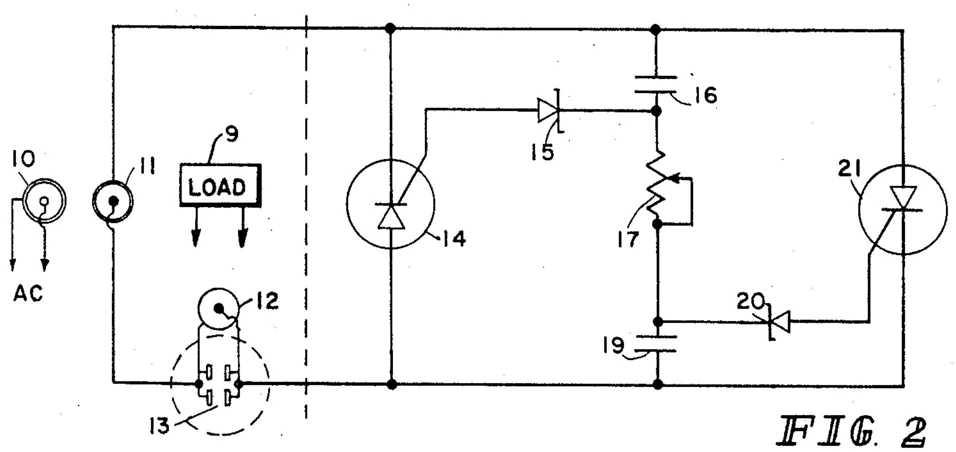
FIGURE 2 is a schematic diagram of the fundamental control circuit used in various embodiments of this invention.

Inasmuch as this control is intended for use with an alternating current source, the current through each controlled rectifier is stopped twice per cycle. This characteristic makes possible the simple control circuit shown in FIGURE 2; all parts to the left of the dotted line being peculiar to the embodiments shown in FIGURES 3, 4 and 5. The basic control circuit is shown to the right of the vertical dotted line.

If a load 9, such as an incandescent lamp, is plugged into either of the outlets 13 or screwed into socket 12, and if screw plug 11 is screwed into the female receptacle 10 which is connected to a source of alternating current of a suitable voltage and frequency, full line voltage is impressed across the anode and cathode of both controlled rectifiers 14 and 21 and also across the series combination of capacitors 16 and 19 and variable resistor 17. The capacitors will begin to charge at a rate governed by the circuit RC. If the source is positive-going, the voltage across capacitor 19 will reach a value which will render Zener diode 20 conductive, triggering the gate and causing current to flow from the anode to the cathode of controlled rectifier 21. This current will be proportional to the instantaneous impressed voltage and as the latter reaches the zero point, the current will also be zero. When the voltage input becomes negative-going, no current will flow through controlled rectifier 21.

As controlled rectifier 14 is connected inversely to 21, its operation is the same as 21 except the action takes place during the negative part of the cycle.

By adjusting variable resistor 17 to its maximum value, the time to charge the capacitors 16 and 19 to the firing potential is increased so that current flow through the controlled rectifiers 14 and 21 occurs only for a fraction of a cycle. With the resistance 17 set at a low value, the capacitors 16 and 19 reach the triggering potential early in the cycle and the current through the controlled rectifiers 14 and 21 flows for virtually the entire cycle.

Figure 11:
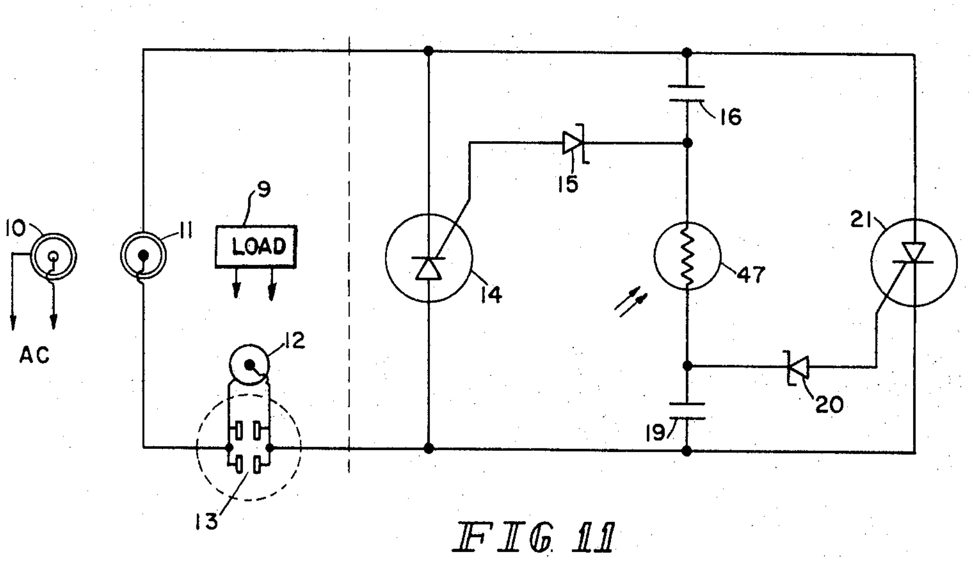
FIGURE 11 is a schematic diagram showing the use of a photoconductive transducer in the fundamental control circuit.
Figure 12:
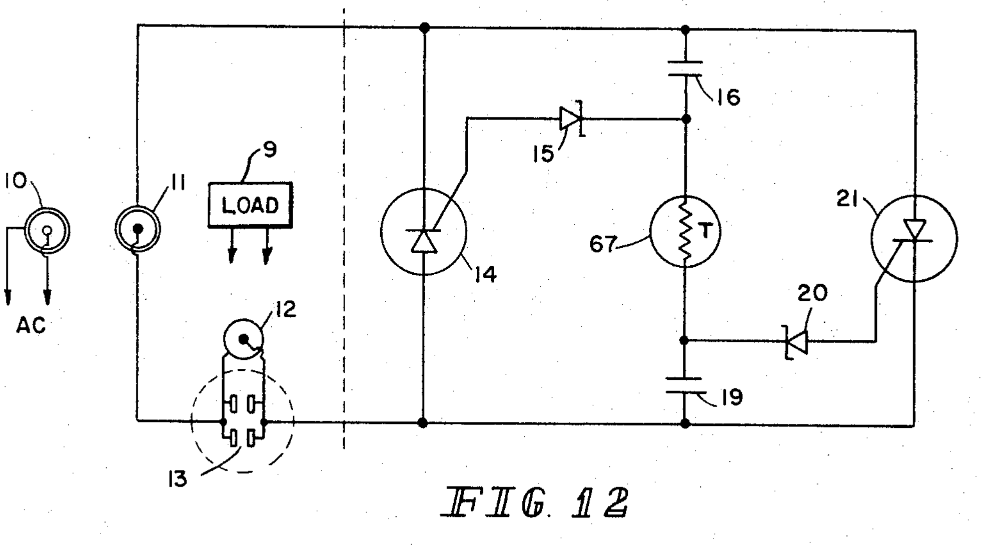
FIGURE 12 is a schematic diagram showing the use of a thermistor in the fundamental control circuit.

Instead of using a manually-operated variable resistor 17, it is feasible to use this circuit to control the output as a function of temperature by using a thermistor 67 as shown in FIGURE 12 or of light intensity by using a photoconductor 47 as illustrated in FIGURE 11 and connected as shown by the dotted lines.

Figures 1, 3, 4, 5:
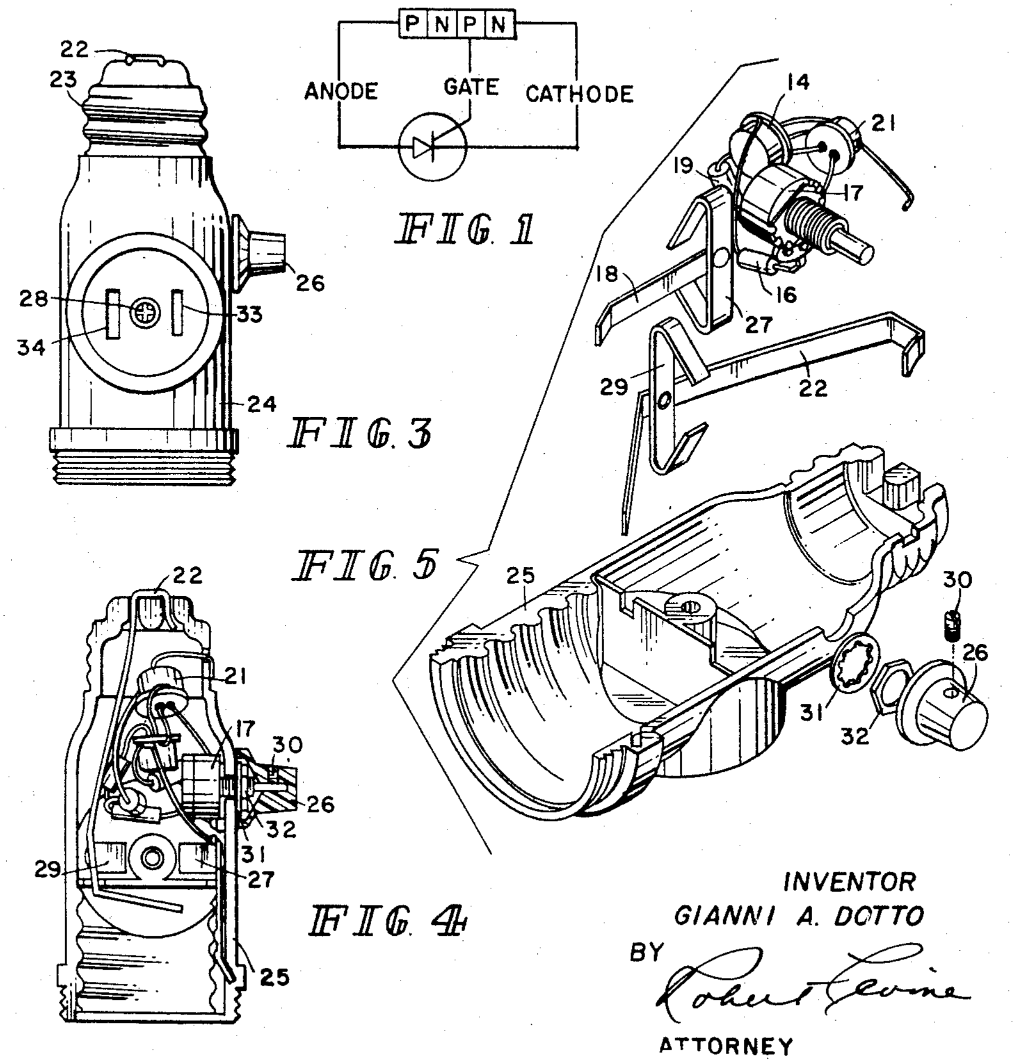
FIGURE 1 illustrates, functionally and schematically, a three junction unidirectional semiconductor which may be used to achieve the objects of this invention.
FIGURE 3 illustrates a typical lamp-socket extension with two plug receptacles and in which the control components are mounted with an externally protruding adjustment knob.
FIGURE 4 is the same as FIGURE 3 but with the upper body shell removed to reveal a typical grouping of the control components.
FIGURE 5 is an enlarged exploded isometric view of the same socket assembly without the upper plastic shell which is complementary to the bottom shell shown.

FIGURE 3 represents one embodiment of this invention which is patricularly useful in converting standard screw-type outlets into controlled outlets. As a male and female screw socket and plugs are provided, the socket extender with female plug-in sockets may be screwed into an existing socket and one or two lamps plugged into the outlets provided, all under control.

FIGURE 4 pictures the socket extender with control circuitry exposed by removing screw 28 and upper body shell 24. The control circuit is built in a fixture in which the parts are mounted, soldered, and trimmed, and when removed from the fixture it is entirely self-supporting with bare leads rigidly separated from each other and adjacent conductors.

FIGURE 5 is an exploded isometric view of the extender. The extender consists of an insulative body formed from two plastic half-shells, 24 and 25, which are similar and complementary. The upper-half 24 is not shown in the exploded view. Conductive spring contacts 18–27 and 22–29 are staked together as shown and assembled into molded cavities so that the open ends of springs 27 and 29 are partially closed, providing considerable force against the sides of each cavity so as to make good electrical contact with the prongs of an externally inserted plug. The pre-assembled control unit is assembled so the threaded bushing lays in the half-round hole of lower shell 25 and lock washer 31 and nut 32 assembled and tightened securely. Set screw 30 is assembled to knob 26 which is slipped over the shaft of variable resistor 17 and the set screw 30 tightened in place.

The hooked end of center contact spring 22 is wrapped around the plastic projection at the male end of lower shell 25 and the opposite end forms the center contact at the female end of the body. The bent end of spring 18 fits into a notch extending below the root diameter of the molded threads in the female end of lower shell 25 and contacts the screw shell of an external screw plug.

The hooked lead from controlled rectifier 21 is placed in the notch protruding into the molded screw threads at the male end of the extender and then clamped by upper shell 24 which is held in position by screw 28 being tightened and the threaded metal shell screwed onto the male end of the extender so it clamps the hooked lead protruding through the slot, after which the metal screw shell is indented so it cannot be unscrewed.

The controlled rectifiers used in the above embodiment are shown enlarged in FIGURE 9C and rated at 1.6 amperes continuous operation, thus resulting in a rating of 300 watts total load for the socket extender.

Figure 6:
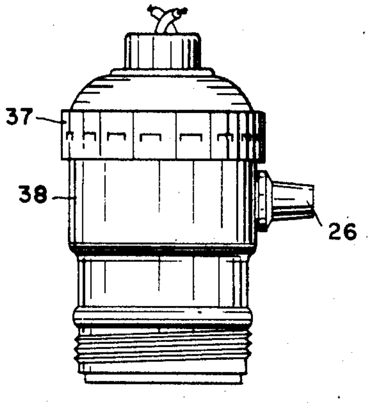
FIGURE 6 represents a front view of a typical brass-shell type socket used on knob-operated 3-way and single light lamps.
Figure 7:
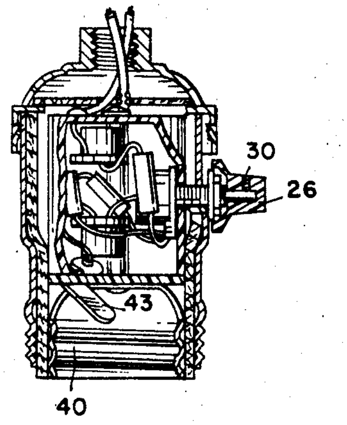
FIGURE 7 is a sectional front view of the same socket shown in FIGURE 6 showing the disposition of the control components within the shell.
Figure 8:
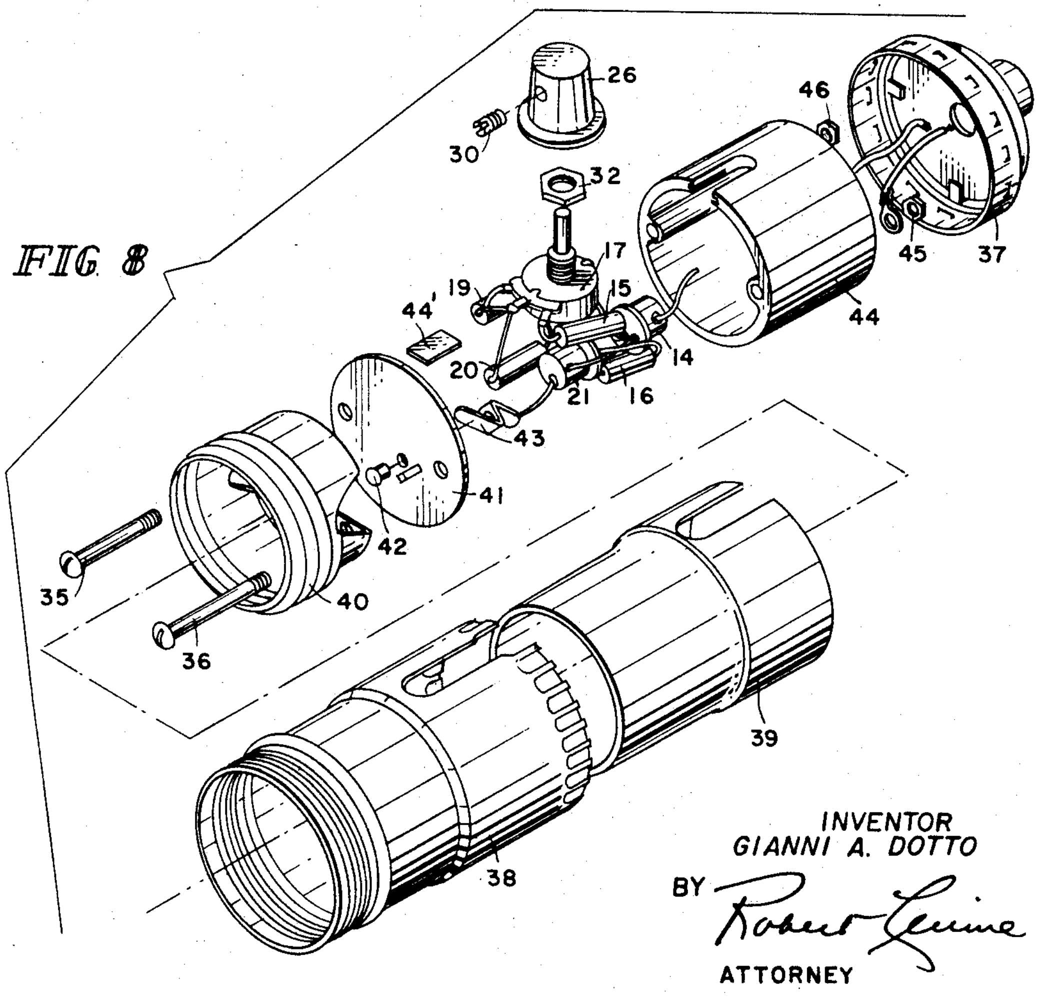
FIGURE 8 is an exploded isometric view of the socket shown in FIGURE 6 showing the inter-relationship of socket parts and control components.

A second embodiment of this invention is shown in FIGURES 6, 7, and 8. This consists of a standard key turn Edison socket with the control circuit mounted in the space originally required for the key turn switch. The control unit is assembled in a fixture in such a way that it is self-supporting and all leads are adequately spaced from one another and do not come in contact with adjacent metal parts.

Center contact spring 43 is inserted through the slot of insulating disc 41 and fastened to it by means of rivet 42. The control unit is placed in insulating housing 44 with the threaded bushing of 17 projecting out of the closed end of the slot and the lead from the case of controlled rectifier 14 inserted through the terminal hole between the two mounting screws, 35 and 36. Retainer 44' is slidably inserted in the grooved slot and retained in position by placing disc 41 over the end of housing 44 after soldering center contact terminal to controlled rectifier 21 case. Threaded shell 40 is placed over disc 41 and mounting screws 35 and 36 are inserted through appropriate holes in shell 40, disc 41 and housing 44, and the assembly held together by nuts 45 and 46 screwed onto the projecting ends of machine screws 35 and 36. The slotted insulating sleeve 39 is slipped over the above assembly with the slot aligned with the projecting bushing and outer shell 38 is slipped over the sleeve 39 and mounting nut 32 placed over the projecting bushing and tightened firmly. Knob 26 is slipped onto the shaft and setscrew 30 inserted into knob 26 and tightened. The cap 37 is pressed over the terminal end of the socket to complete the assembly.

Figures 9, 10:
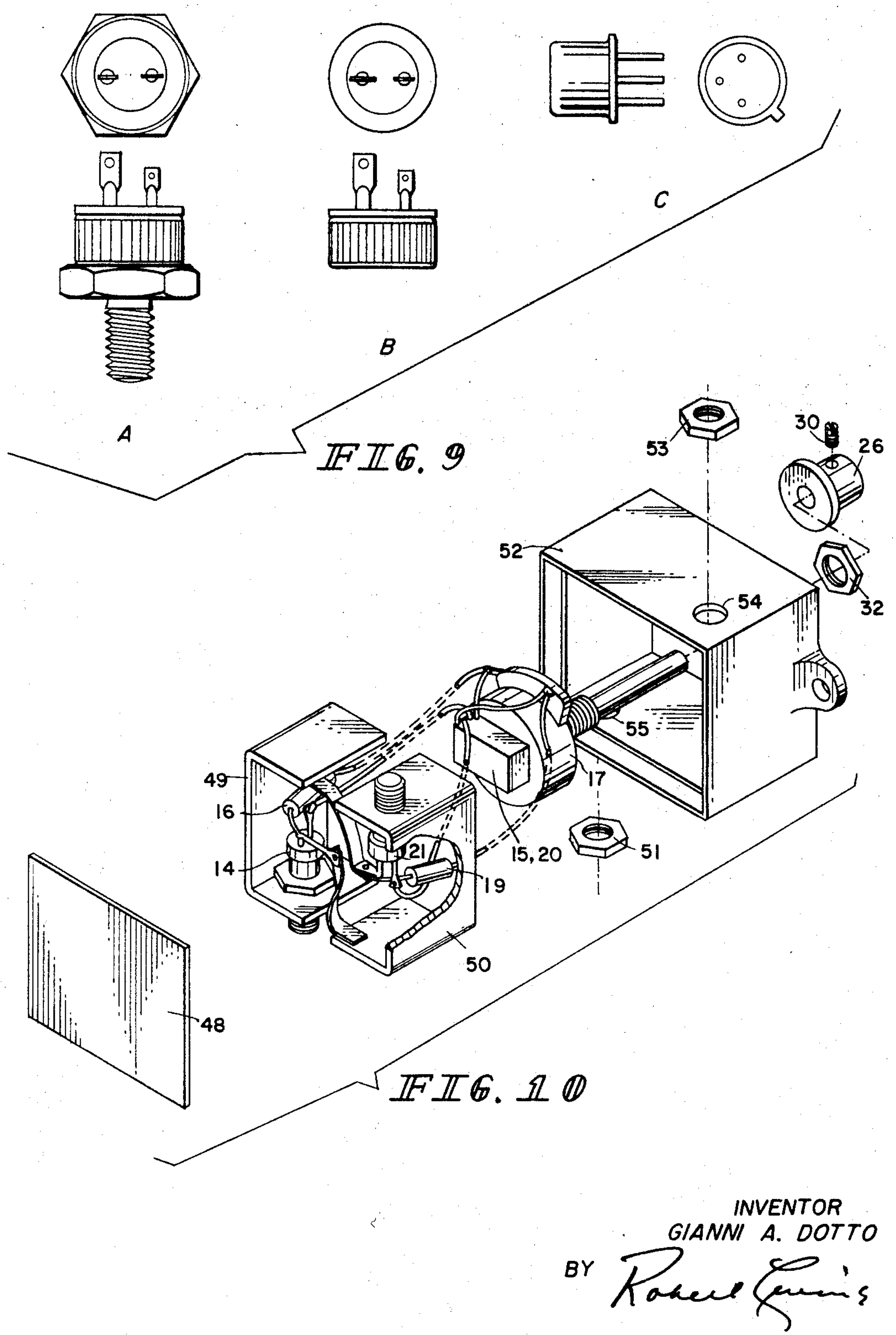
FIGURE 9 shows 3 outline drawings of typical controlled rectifiers as used in the various embodiments of this invention.
FIGURE 10 is an exploded isometric view of a high-current embodiment of this invention.

The same technique of assembling the control components in a fixture to form a rigidized assembly may be applied to feed-through switches, cube taps, wall switches and similar low wattage devices. However, the same circuitry may be used with higher power controlled rectifiers such as shown in FIGURES 9A and 9B. Both of these controlled rectifiers require some type of heat sink for operation at maximum rating. A typical embodiment using FIGURE 9A controlled rectifier is shown in FIGURE 10. This is an isometric exploded view of a control unit rated at 50 amperes using 2 General Electric Co. silicon controlled rectifiers C–30B rated at 25 amperes each.

This unit is assembled by placing the components in a fixture and soldering terminals with heavy leads. The heat sinks are included, as the anodes of the controlled rectifiers must make good thermal and electrical contact to them. The shaft and bushing of rheostat 17 are inserted into the center hole of the plastic molded case 52 and the rest of the assembly is inserted into the case until the holes 54 and 55 are in alignment with the controlled rectifier studs. At this point, the studs are pushed through the holes and mounting nuts 51 and 52 are screwed thereon. The mounting holes 54 and 55 are located close to the edge of the case so as to prevent rotation of the controlled rectifier when it is tightened. Lid 48 is snapped into place to close the back-side of the case.

The standard wall switch box which is rated at 15 amperes has ample space for a pair of controlled rectifiers such as shown in FIGURE 9B (General Electric Co. C–22B) and rated at 7.4 amperes each. As the heat sink requirements are not as stringent as for the higher-rated unit, a smaller heat sink pressed over the knurl of the controlled rectifier is adequate. Otherwise, the control is very similar to the one just described.

Units have been constructed with the three sizes of controlled rectifiers shown in FIGURE 9 and using 10–25 v. Zener diodes, 1–3 mfd. 100 wv, capacitors and 15K–250K ohm rheostats and have successfully handled rated tungsten lamp loads (high inrush current) and various sizes of universal motors.

Having thus disclosed this invention completely the following claims are hereby made:

1. In a control circuit for use with an alternating current source and intended to regulate the power input to a substantially resistive load, the use of a first gated 4-layer semiconductor device with the P-end connected to a first side of said load, a second side of said load connected to a first side of said source, a second 4-layer semiconductor device with the P-end connected to a second side of said source, the N-end of said first semiconductor connected to said second side of said source, the N-end of said second semiconductor connected to said first side of said load, a first side of a first capacitor connected to the second side of said source, a second side of said first capacitor connected to a first side of a rheostat, a second side of said rheostat connected to a first side of a second capacitor, a second side of said second capacitor connected to said first side of said load, gate of first semiconductor connected to anode of a first Zener diode, cathode of first Zener diode connected to the second side of said first capacitor, gate of second semiconductor connected to anode of said second Zener diode, cathode of said second Zener diode connected to first terminal of said second capacitor and adjustment of said rheostat to maximum resistance decreases power to said load and adjustment of said rheostat to minimum resistance increases power to said load.

2. In the circuit described in claim 1, using a photo semiconductor instead of a rheostat to vary the power delivered to the load as a function of light intensity on the photo semiconductor.

3. In the circuit described in claim 1, using a thermistor instead of a rheostat to regulate power delivered to the load as a function of temperature of the thermistor.

4. In a control circuit for use with an alternating current source for regulating the power input to a load means, a first controlled gate device connected between a first side of said load and a second side of said source, a second side of said load connected to a first side of said source, a second controlled gate device connected between a second side of said source and said first side of said load, a first capacitor connected between the second side of said source and resistance means, a first diode connected between the gate of said first controlled gate device and the junction between said resistance means and said first capacitor, said first capacitor and said resistance means and said first diode providing a time delay of a first gating signal, said first diode having a breakdown value substantially equal to the magnitude of said first gating signal, a second capacitor connected between said resistance means and said first side of said load, a second diode connected between the gate of said second controlled gate device and the junction between said resistance means and said second capacitor, said second capacitor and said resistance means and said second diode providing a time delay of a second gating signal, said second diode having a breakdown value substantially equal to the magnitude of said second gating signal, said first controlled gate device biased to conduction by said first gating signal allowing current to flow from said source to said load, reversal of said current flow from said source through said first controlled gate device biasing said first controlled gate device to non-conduction, said second controlled gate device biased to conduction by said second gating signal allowing current to flow from said source to said load, reversal of said current flow from said source through said second controlled gate device biasing said second controlled gate device to non-conduction, and said resistance means regulating the power delivered to said load.

5. In a control circuit for use with a alternating current source for regulating the power input to a load means as claimed in claim 4, wherein said resistance means is variable thereby providing a range of power deliverable to said load.

6. In a control circuit for use with an alternating current source for regulating the power input to a load means as claimed in clam 4, wherein said resistance means is a thermistor.

7. In a control circuit for use with an alternating current cource for regulating the power input to a load means as claimed in claim 4, wherein said resistance means is a photoconductive transducer.

8. In a control circuit for use with an alternating-current source for regulating the power input to a load means, a pair of paralleled, oppositely-poled gate-controlled rectifiers having anodes and cathodes connected across a series combination of said source and said load means, a series circuit of a resistance means having its ends jointed to a pair of capacitors, said series circuit being coupled across said series combination, and a pair of diode means having constant voltage drop thereacross and connected respectively between a gate of one of said rectifiers and one of said ends of said resistance means.

9. A combination according to claim 8 wherein said resistance means is a photoconductive resistor.

10. A combination according to claim 8 wherein said resistance means is a temperature-sensitive thermistor.

References Cited

UNITED STATES PATENTS

| | | | |
|---|---|---|---|
| 2,877,359 | 3/1959 | Ross | 307—88.5 |
| 3,097,314 | 7/1963 | Harriman | 307—88.5 |
| 3,103,618 | 9/1963 | Slater | 323—22 |
| 3,218,511 | 11/1965 | Rosenbaum | 315—207 |
| 3,256,466 | 6/1966 | Trolio et al. | 317—101 |
| 3,264,518 | 6/1966 | Stauverman | 307—88.5 |
| 3,287,571 | 11/1966 | White | 307—88.5 |

OTHER REFERENCES

"Silicon Controlled Rectifier Designers' Handbook," Westinghouse Electric Corporation, Semiconductor Division, Youngwood, Pa. Sept. 9, 1963, pages 7–72, 7–73.

DAVID J. GALVIN, *Primary Examiner.*

C. R. CAMPBELL, *Assistant Examiner.*